Aug. 10, 1937.    W. S. HOWARD    2,089,374
VALVE MECHANISM
Filed Dec. 28, 1935    3 Sheets-Sheet 1

INVENTOR.
William S. Howard.
BY
Harness, Dickey, Pierce & Han
ATTORNEYS.

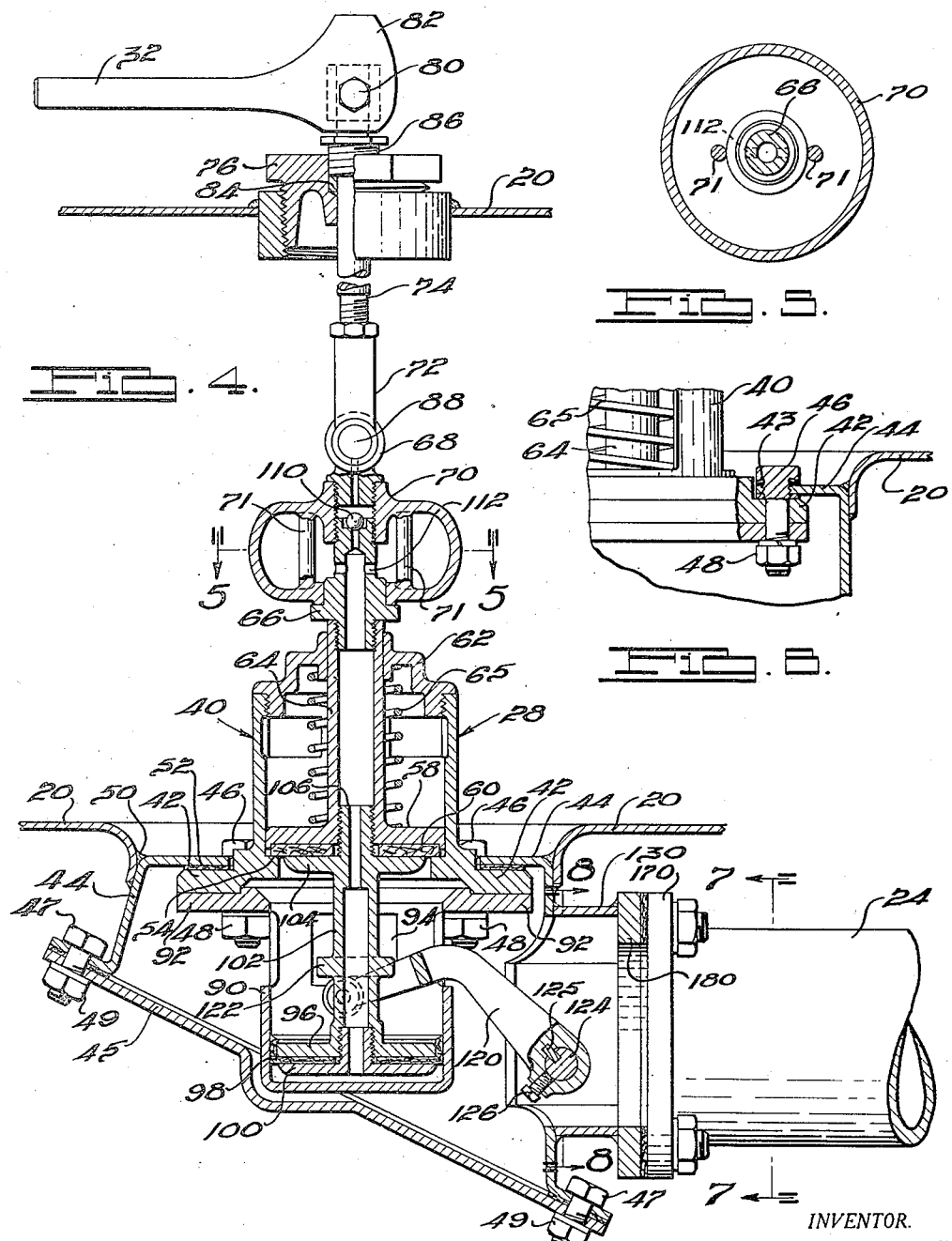

Aug. 10, 1937.    W. S. HOWARD    2,089,374
VALVE MECHANISM
Filed Dec. 28, 1935    3 Sheets-Sheet 3
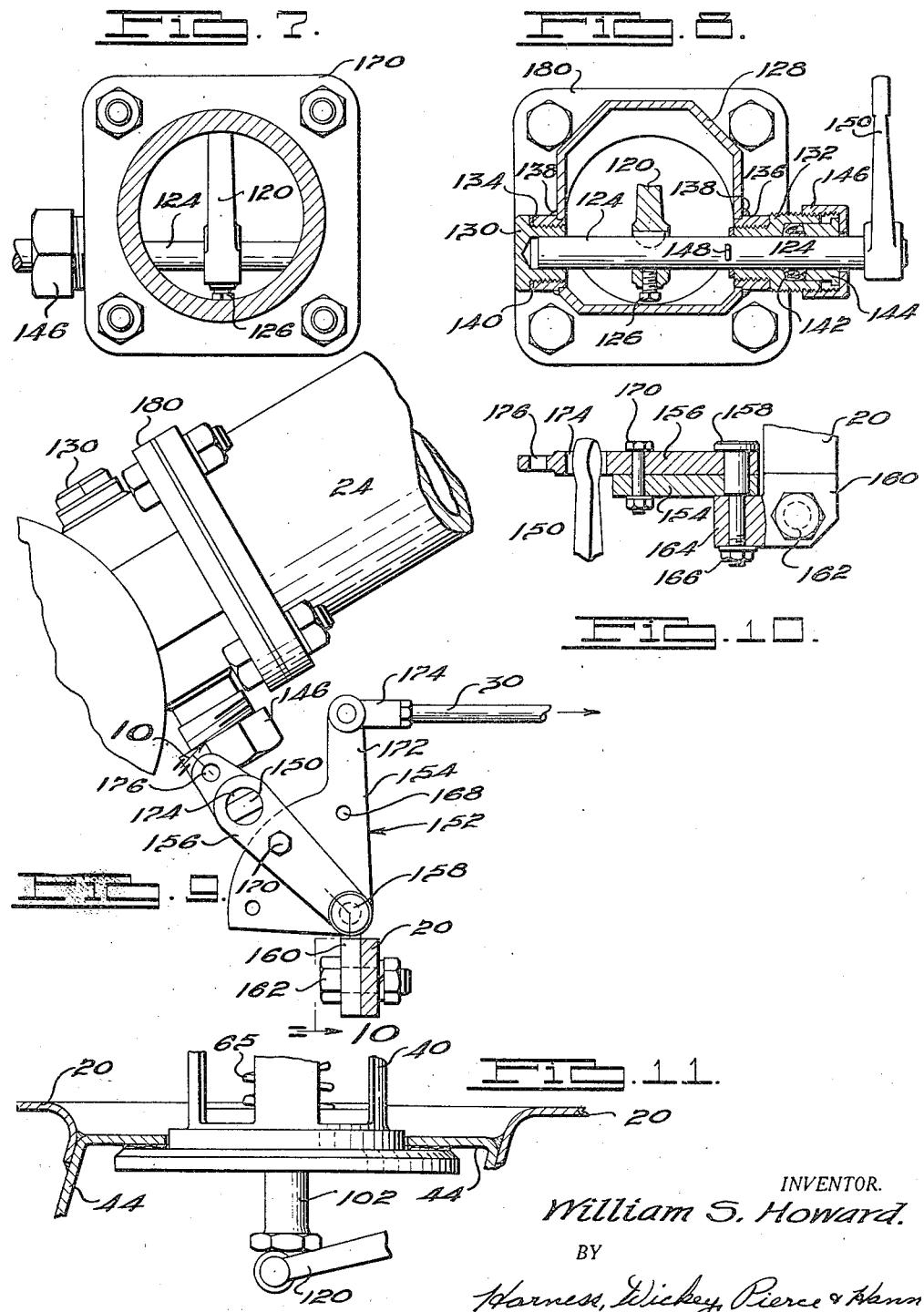
INVENTOR.
William S. Howard.
BY
Harness, Dickey, Pierce & Hann
ATTORNEYS.

Patented Aug. 10, 1937

2,089,374

UNITED STATES PATENT OFFICE 2,089,374

VALVE MECHANISM

William S. Howard, Chicago, Ill., assignor to Gar Wood Industries, Inc., a corporation of Michigan Application December 28, 1935, Serial No. 56,434

12 Claims. (Cl. 137—21)

The present invention relates to valve mechanism, and more particularly to valves suitable for use in the transportation and handling of liquid fuels, oils, acids, and similar commodities in quantity.

Principal objects of the present invention include the provision of a valve which may be used as an overhead operated valve, or as an under body operated valve; which may be remotely controlled by manual or other means comprising levers, cables or the like; and which is readily adaptable for cooperation with a balancing valve, so that the valve may be opened or closed without being affected by the pressure within the system.

Further objects of the present invention include the provision of an overhead operated tank valve comprising a valve piston slidably supported in a casing secured to the base of the tank, and having an operating stem which extends upwardly through the tank top for cooperation with an overhead operated member; in which the connection leading to the overhead operating member is flexible to prevent injury to the valve parts due to vibration of the tank; and in which the overhead actuating member is effective independently of the operating condition of an associated under body operating member.

Further objects of the present invention include the provision of an under body operated valve comprising an operating lever secured to the underside of the tank, and having a lost motion connection with the above mentioned valve stem; in which the operating lever is supported in suitable spaced relation from the under side of the tank, providing a clear space right and left for operating cables, rods, or other connections; and in which the connections for the operating levers is adjustable to permit them to extend from the tank in different angular directions with respect to it.

Further objects of the present invention include the provision of a valve of the above stated type in which the balancing valve comprises a casing secured to the under side of the tank by the same means which also supports the main valve casing; in which the balancing valve comprises a piston connected to the stem of the main valve piston, and so related thereto that pressures within the system are balanced between the main and auxiliary systems; in which the diameter of the auxiliary piston slightly exceeds the diameter of the main piston, so that a differential pressure exists tending to hold the main piston in valve closing postion; in which the balancing valve casing is provided with an opening through which the under body operating lever extends for cooperation with the valve stem; in which the valve stem is bored out to form a connection between the end of the auxiliary casing and the auxiliary piston; comprising an air chamber which functions to prevent the development of a vacuum in the auxiliary casing in the opening movement of the valve; and in which the cored out stem is provided with a check valve to prevent the contents of the tank draining into it.

Further objects of the present invention include the provision of a multiple purpose valve as above stated, in which the valve parts are secured to the underside of the tank by readily removable bolts, and in which the valve parts may all be removed from the under side of the tank.

Further objects of the present invention are to generally improve and simplify the construction and operation of valves of the character stated.

With the above and other objects in view, which appear in the following description and in the appended claims, an illustrative and preferred embodiment of the present invention is shown in the accompanying drawings, throughout the several views of which corresponding reference characters are used to designate corresponding parts, and in which:

Fig. 4 is a view in vertical central section taken along the line 4—4 of Fig. 3;

Fig. 5 is a view in horizontal section taken along the line 5—5 of Fig. 4;

Fig. 6 is a fragmentary view partly in section, taken along the line 6—6 of Fig. 3;

Fig. 7 is a view in vertical section taken along the line 7—7 of Fig. 4;

Fig. 8 is a view in vertical section taken along the line 8—8 of Fig. 4;

Fig. 9 is a view taken along the line 9—9 of Fig. 1;

Fig. 10 is a fragmentary view taken along the line 10—10 of Fig. 9; and

Fig. 11 is a fragmentary view of a modified embodiment of the present invention in which the balancing portions of the structure are eliminated.

Figure 1:
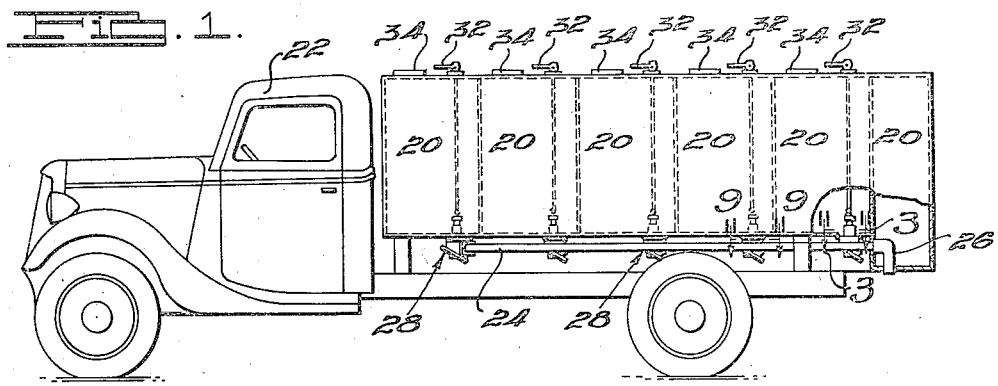
Fig. 1 is a view illustrating the application of a plurality of the valves of the present invention to a tank truck.

In the form illustrated, the improved valve mechanism of the present invention comprises generally a main valve casing which is removably secured within and to the bottom of the associated tank. The base of the casing is normally closed by a piston which is slidably supported within the casing. The valve stem extends upwardly through the tank to an overhead operating lever, and also extends below the tank to an under body operating lever. Lost motion connections are used, so that either the overhead or under body lever may be operated to open the valve independently of the other. The upper end of the valve casing is enclosed by a cap threaded thereon, which guides the upwardly extending valve stem, and also supports a spring for biasing the valve piston to the closed position. The valve casing is also provided with side openings through which the tank contents are discharged, and these side openings preferably extend completely down to the valve seat so as not to pocket the valve piston.

The balancing valve comprises a casing which is supported to the underside of the bottom of the tank by the same bolts which support the previously mentioned main casing. The upper end of the balancing casing is open and the lower end thereof is enclosed. A balancing piston is slidably supported within the balancing casing, and is directly connected to the valve stem.

With this arrangement the pressure within the cylinder acts in opposite directions upon the main and balancing valve pistons, so that, depending upon the relative areas of the two, the valve position may be substantially balanced, or a differential pressure may be provided. Preferably, the balancing piston is of slightly larger diameter than the main piston, so that a slight differential pressure is produced which urges the valve into the closed position.

The valve stem is bored out, to prevent the accumulation of pressure in the space between the auxiliary piston and the base of the balancing casing by leakage past the balancing piston. The opening in the stem extends upwardly, and at its upper end is closed by a ball check valve which prevents the contents of the tank from flowing into the breather. Preferably, and as illustrated, an air chamber is applied at the top of the valve stem in communication with the opening in the latter, and thus also in communication with the space between the closed end of the balancing casing and the balancing piston. The air in this chamber reduces any vacuum which might otherwise be produced in the space between the base of the balancing casing and the balancing piston in an opening movement of the valve, and thus permits rapid opening and closing of the valve.

The tank contents, as discharged through the main and balancing valves, pass through openings in the side walls of the balancing casing into an enclosing chamber for the latter, the face of which is removably bolted to the underside of the tank. From this chamber, the contents pass into the distribution piping.

The distribution piping is illustrated as nested on the underside of the vehicle, and the valve ends of the pipes thus are variously angled to the right or left of the center line of the vehicle. A further feature of the present invention is the adaptability of the under body operating lever to cable levers or other operating members which extend to the rear of the vehicle, and which may be connected for effective operation independently of the above mentioned angles to the right or left.

Figure 2:
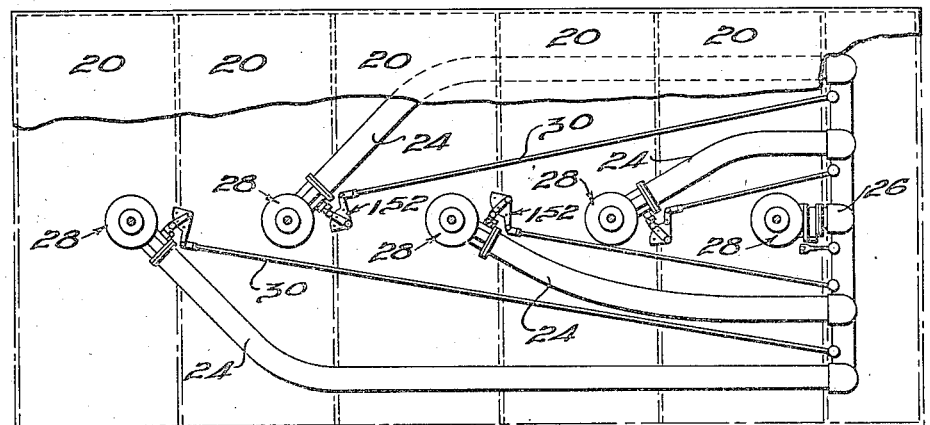
Fig. 2 is a bottom plan view of the structure shown in Fig. 1.
Figure 3:
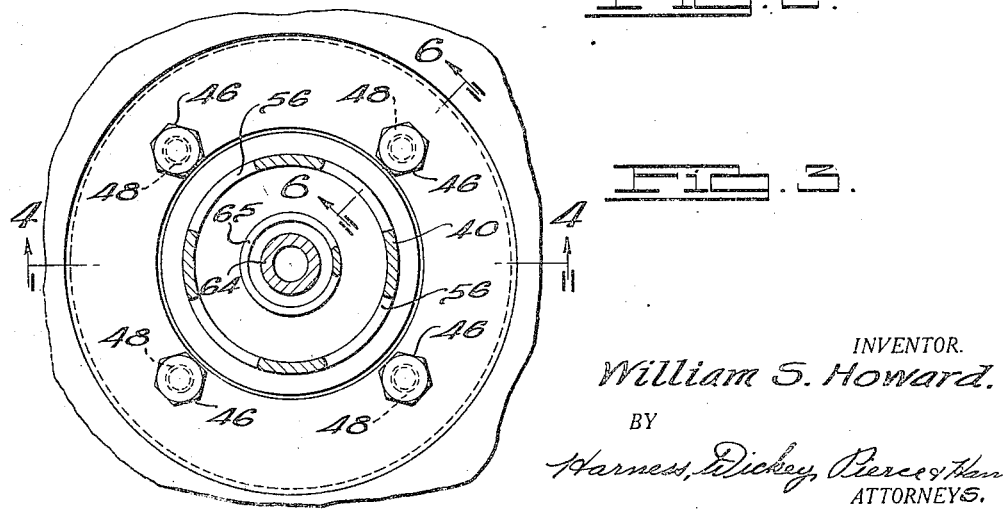
Fig. 3 is a view in horizontal section taken along the lines 3—3 of Fig. 1.

Considering the above mentioned elements in more detail and referring particularly to Figs. 1 and 2 of the drawings, a plurality of individual tanks 20 are illustrated as supported upon an illustrative truck 22. Each of the tanks 20 is provided with an associated under body pipe 24, which leads therefrom to a collecting manifold 26, positioned at the rear end of the truck, and through which the contents of the respective tanks may be selectively discharged. One of the improved valves 28 of the present invention is secured to the base of each of the tanks 20, to control the discharge of the contents therefrom, and each of such valves is arranged for individual under body control by an associated cable 30, which leads therefrom to an operating position at the rear end of the truck. Each of the valves is also subject to overhead control by a cam handle 32, positioned at the top of the associated tank. Each of the tanks 20 is arranged to be filled through top openings, normally closed by removable covers 34. As described in more detail below, either of the overhead and under body operating mechanisms 30 and 32 respectively, may be actuated to open the associated valves independently of the position of the other, so that a failure of either does not disable the valve.

Referring particularly to Figs. 3 through 6, each of the valves 28 comprises a main casing 40, the base of which is provided with an annular shoulder 42, through which the casing 40 is secured to the underside of the enclosure 44 by a series of bolts 46 which extend through corresponding openings formed in the base 42 and similar openings formed in the enclosure 44. As best shown in Fig. 6, the openings in enclosure 44 are tapped with left hand threads, and the shanks of bolts 46 are correspondingly threaded, so that upon turning the head of each bolt 46 down onto the enclosure 44, further turning of such shank is prevented, thus permitting the associated nut 48 to be tightened down entirely from the outside of the tank 20. Copper washers 43 are preferably interposed between the heads of bolts 46 and enclosure 44. The enclosure 42 is preferably generally cylindrical in shape and is rigidly and permanently secured, as by welding at the point 50, to the corresponding opening formed in the underside of the tank 20. Preferably, and as illustrated also, a suitable gasket 52 is placed between the enclosure 44 and the shoulder 42 of cylinder 40, thus insuring a fluid tight joint. The underside of enclosure 44 is closed off by a plate 45, secured to the outwardly flared edges of the former by the bolts 47 and nuts 49. It will be noted that the enclosure 44 extends downwardly somewhat below the base of the tank 20, thus affording ready access to the heads of bolts 47, and facilitating the removal thereof. In the practice of the present invention, a substantial advantage is found to result from the use of the removable bolts 46 as distinguished from the use of integrally formed studs, particularly in view of the ease with which the bolts may be removed, and replacements made.

The lower end of casing 40 is provided with the annular shoulder 54 which defines a valve opening, and the side walls are apertured as at 56 to provide openings through which the contents of the tank 20 may be discharged. The valve opening is normally closed by a piston 58 and a cooperating gasket 60, which seats against the shoulder 54. The upper end of casing 40 is closed by a cap 62, threaded thereon, which also cooperates with the side walls of casing 40 to guide the movements of piston 58 and the stem 64 thereof, and forms a seat for one end of a valve spring 65 which bears against piston 58 and biases it to the closed position.

The stem 64, which is preferably formed integrally with the piston 58, extends through the cap 62 and is provided with internal threads which cooperate with the externally threaded shank of an extension 66. Extension 66, in turn, is secured to an eye 68, through the internally threaded shank of the chamber 70, later described. Eye 68 is connected through a clevis 72 to a valve rod 74, which extends outwardly through a plug 76 for cooperation with the overhead cam handle 32. Cam handle 32 is pivotally secured by pin 80 to the upper end of rod 74 and it will be understood that clockwise rotation of handle 32, as viewed in Figure 4, cams rod 74 upwardly by the engagement of the cam portion 82 with the upper surface of the plug 76, thereby raising the valve stem 64 and raising piston 58 from its associated seat 54 and opening the valve. As will also be evident, plug 76 is threaded into the upper surface of tank 20, to provide a fluid-tight joint, and a corresponding fluid-tight joint between plug 76 and rod 74 is provided by the packing gland 84 and bushing 86. Preferably, the pin 88, through which eye 68 is connected to clevis 72 is somewhat smaller in diameter than the opening in eye 68, so that a somewhat loose and flexible joint is provided. This connection is advantageous in that it prevents any relative movement of the upper part of the tank with respect to the lower part, such as caused by vibration, from twisting or bending the valve parts.

The balancing casing 90, also cylindrical in shape, is provided with an enclosed lower end and an open upper end. The shoulder 92 formed integrally with casing 90 is formed to seat against the bottom of the shoulder 42 of the main casing 40, and is provided with suitable openings through which the previously mentioned bolts 46 may be passed to secure casing 90 in position. The side walls of casing 90 are provided with a plurality of spaced openings 94, through which the contents of the tank are discharged, and which are positioned above the point to which the associated piston 96 rises during an opening movement.

The balancing piston 96, preferably provided with a conventional leather cup 98 secured thereto by the plate 100 which is threaded into piston 96, is provided with a shank 102 which extends upwardly therefrom and terminates in an enlarged plate 104, which bears against gasket 60 and secures the latter in place to the underside of the main piston 58. The end 106 of shank 102 is externally threaded and is threaded into a base of main piston 58. With this arrangement, it will be evident that the main and balancing pistons 58 and 96 respectively move together as a unit. It will also be evident that any pressure within the enclosure 44 acts in opposite directions upon the under side of the main piston 58 and the upper side of the balancing piston 96. The balancing piston 96 is preferably of an area slightly greater than the area of the main piston 58, so that a slight differential pressure is thus produced tending to hold the valve in the closed position.

The plate 100, piston 96, shank 102, stem 64, extension 66 and eye 68 are each provided with a bore which places the space between the bottom of balancing casing 90 and balancing piston 96 in communication with the interior of the tank 20, thus affording a bleeder to prevent the development of an undue pressure below piston 96 by leakage of the fluid contents around the balancing piston 96. A check valve 110 is seated at the upper end of the extension 66, and acts to prevent the contents of tank 20 from flowing downwardly through the bore. In order also to prevent the development of a vacuum in the area between the under side of balancing piston 96 and casing 90, the breather 70 is provided, which comprises an enclosed chamber with internal ribs 71, and the interior of which communicates with the previously mentioned bore by a side passage 112 formed in extension 66. The breather acts, as will be understood, to promote an easy opening movement of the valve mechanism.

The under body operating mechanism for each valve comprises a lever 120, the left hand end of which, as viewed in Figure 4, is bifurcated, and freely engages the underside of a collar 122 formed on the shank 102. The right hand end of lever 120, as viewed in Figure 4, is keyed to an operating shaft 124 and is fixed axially thereof by a set screw 126. The bifurcated end of arm 120, which surrounds shank 102, also serves to position arm 120 on shaft 124, so that, if desired, set screw 126 may be dispensed with. Set screw 126 is particularly desirable in the absence of the bifurcated type of arm, as described later in connection with Figure 11.

Referring particularly to Figs. 7 through 10, shaft 124 passes transversely through and is rotatably supported in an extension 128 which is preferably formed integrally with enclosure 44. The ends of shaft 124 are rotatably supported in bosses 130 and 132 respectively, which are threaded into sleeves 134 and 136 which are suitably secured to the opposite sides of extension 128 as by welding at the points 138. One end of boss 130 is closed off and may be formed as a nut. A gasket 140 is preferably interposed between such end and the outer end of the cooperating sleeve 134. Shaft 124 passes axially through boss 132, and a fluid-tight seal is provided between these members by the gland 142, bushing 144 and collar 146. Shaft 124 may be slotted as at 148 to accommodate a cotter pin to secure it against movement to the right as viewed in Figure 8. Corresponding movement to the left is prevented by the engagement between the left hand end of shaft 124 and the inner surface of boss 130. It will be observed that bosses 130 and 132 are interchangeable in position, so that shaft 124 may be installed for either right hand or left hand operation, as viewed in Figure 8.

Crank arm 150 is secured to the outer end of shaft 124 and is disposed for actuation in either a valve opening or a valve closing direction by the illustrative cable 30 through a lever connector 152. Connector 152 comprises a plate 154 and a cooperating arm 156, both of which members are pivotally mounted through a pin 158 to a bracket 160 which may be secured to the underside of the associated tank 20 by a stud 162. Pin 158 passes through and is secured by a nut 166 within a boss 164 formed integrally with the associated bracket 160. Each plate 154 is provided with a series of holes 168 located on an arc concentric with the pin 158, and through which a bolt 170 may be passed to secure plate 154 and arm 156 against relative rotation. It will be noted that the provision of a plurality of openings 168 permits plate 154 and arm 156 to be secured in any of a plurality of relative rotative positions. Plate 154 also comprises a lug or extension 172, through which it may be connected to a cable 30 by the clevis 174. Arm 156 includes an opening 174 adapted to somewhat freely receive the upper end of the lever 150, and also includes an additional opening 176 through which it may, if desired, be pinned to the previously mentioned clevis 174.

With this arrangement, it will be noted that connector 152 provides for the connection of a cable 30 and a valve arm 150 together at any of a plurality of relative angular positions. For example, with cable 30 connected to the plate 154 as shown in Figure 9, the arm 156 may be connected in any one of the holes 168, thus providing a choice of three connecting positions. Three additional connecting positions are provided by inverting the plate 154. An additional connection is provided by connecting the cable 30 to the end of the arm 156 through the opening 176 formed therein.

As an alternative to the use of the main valve, in combination with the above described balancing mechanism, the arrangement of Figure 11 may be utilized, in which the construction of the main valve is as previously described, but the balancing mechanism is eliminated, and the operating arm 120 bears directly against the lower end of the stem 102. In all other respects, the arrangement may be and preferably is as described in connection with Figures 1 through 10.

Considering the operation of the device as a whole, it will be evident that each of the valves 28 may be opened by pulling the associated cable 30 to the right, as viewed in Figure 2, thus rotating the associated arm 120 in a clockwise direction, as viewed in Figure 4. This action raises the main and balancing pistons 58 and 96. The raising of main piston 58 opens off the base of the main casing 40, permitting the contents of the associated tank 20 to discharge through the side openings in the walls of casing 40, through the base opening therein, through the balancing casing 90, enclosure 44, and out through the associated piping 30. With the valve parts in the open position, the fluid pressure within enclosure 44 acts in opposite directions upon the main and balancing pistons, thus rendering the positions thereof substantially independent of such pressure. As previously mentioned, the area of the balancing piston slightly exceeds that of the main piston, so that a slight differential pressure exits tending to move the valve to a closed position. The fluid discharged through the pipe 30 is received in the previously mentioned collecting manifold 26, from which it may be discharged in any suitable or conventional manner.

A closing movement of the valve mechanism may also be effected by a reverse movement of the actuating cable 30, thus permitting the arm 120 to rotate in a counter-clockwise direction, as viewed in Figure 4. This return movement of arm 120 is accompanied by a corresponding closing movement of the valve as influenced by the balancing spring 65 and the differential pressure. With the parts in the valve closing position, any pressure existing within enclosure 44, such, for example, as might be produced by a back pressure through the collecting manifold 26, acts in opposite directions, and with substantially offsetting effects, upon the underside of main piston 58 and the upper side of the auxiliary piston 96.

During the above described opening and closing movements of the valve, a transfer of air occurs between the underside of balancing piston 96 and the breather 70. As will be understood, the capacity of breather 70 is such that during an opening movement, sufficient air is available for movement into the space underneath piston 96 to avoid the development of a vacuum which might otherwise retard such opening movement. The cored out stem and check valve 110 also afford a bleeder connection to prevent the development of an undue pressure below piston 96 due to leakage past piston 96.

The above described opening and closing movements in response to arm 120 may be effected independently of the position or condition of the associated overhead lever 32, as will be understood. It will also be evident that a corresponding opening and closing action may be effected by rotating lever 32 about its pivot 80, independently of the position or condition of the under body actuating arm 120. The under body and overhead operating mechanisms are thus independently effective and either may be actuated at any time.

Although specific embodiments of the present invention have been described, it will be evident that various changes may be made in the form, number and arrangements of parts thereof within the spirit and scope of the present invention.

What is claimed is:

1. Tank valve mechanism comprising in combination a tank having a valve opening formed therein, a valve for opening and closing said opening, balancing valve mechanism associated with said valve for balancing fluid pressures exerted on said valve and comprising spaced movable piston members disposed to be oppositely affected by said fluid pressures, a stem connecting said pistons, and a valve operator engageable with said stem.

2. Tank valve mechanism comprising in combination, a tank having a valve opening formed therein, a valve for opening and closing said opening, a balancing valve mechanism associated with said valve and effective to balance external pressures exerted on said valve and comprising spaced movable piston members disposed to be oppositely affected by said fluid pressures, a stem connecting said pistons, and a valve operator engageable with said stem.

3. Tank valve mechanism comprising in combination, a tank having a valve opening therein, a distribution line associated with said tank, a valve positioned within said tank effective to open and close said opening comprising a piston, an auxiliary piston, a stem connecting said auxiliary piston to said valve piston to offset pressures exerted on said valve piston through said distribution line, and an operator for said valve engageable with said stem.

4. Tank valve mechanism comprising in combination, a tank having a valve opening formed in the base thereof, a valve enclosure supported below the base of said tank, a valve piston positioned within said tank and effective to open and close said openings, and a balancing piston positioned within said enclosure and connected to said valve piston to balance pressures exerted on said valve system through said enclosure.

5. Tank valve mechanism comprising in combination, a tank having a valve opening formed in the base thereof, a valve for opening and closing said opening comprising a casing supported within said tank in said opening and having a piston slidably supported therein, a balancing casing in axial alignment with said valve casing and secured to the underside of the base of said tank, and a balancing piston in said balancing casing connected to said valve piston.

6. Tank valve mechanism comprising in combination, a tank having a valve opening formed in the base thereof, a valve for opening and closing said opening comprising a casing secured over said opening within the tank and having a piston slidable therein, a balancing casing secured to the underside of the base of said tank in axial alignment with said valve casing, a balancing piston slidable in said balancing casing, a connection between said valve and balancing piston, and an operating member for slidably moving both of said pistons.

7. Tank valve mechanism comprising in combination, a tank having a valve opening in the base thereof, a valve for opening and closing said opening comprising a casing supported over said opening within said tank and having a piston slidable therein, a balancing casing associated with said valve secured to the underside of the base of said tank in axial alignment with said first mentioned casing and having an enclosed lower end, a piston slidable in said balancing casing and connected to said valve piston, said main and balancing casings having fluid openings formed in the side walls thereof.

8. Tank valve mechanism comprising in combination, a tank having a valve opening formed in the base thereof, a valve for opening and closing said openings comprising a casing supported over said opening within said tank and having a piston slidable therein, a balancing casing secured to the underside of the base of said tank in axial alignment with said main casing and having an enclosed lower end, a balancing piston slidably supported in said balancing casing and connected to said main piston, and means forming a breather for the space between the underside of said balancing piston and the enclosed lower end of said balancing casing.

9. Tank valve mechanism comprising in combination a tank having a valve opening formed in the base thereof, a valve for opening and closing said opening comprising a casing supported over said opening and having a piston slidable therein, a balancing casing secured to the underside of the base of said tank in alignment with said opening and having an enclosed lower end, a piston slidable in said balancing casing, and a connection between said main and balancing pistons constructed to provide a breather for the space between the underside of said balancing piston and the enclosed lower end of said balancing casing.

10. Tank valve mechanism comprising in combination, a tank having a valve opening formed in the base thereof, a cylindrical casing secured over said opening within said tank and having openings formed in the side walls thereof, a piston slidable upwardly within said casing to bring said side openings and said valve opening into communication, spring means for biasing said piston to a closed position, and an operating member having a lost motion connection with said piston for causing an opening movement thereof.

11. Valve mechanism for use in vehicle carried tanks, comprising in combination a valve positioned on the underside of a tank, an operating lever for said valve, an operator for said lever extending to the rear of said vehicle, and a connector between said operator and said lever adapted to permit said lever and said operator to be positioned at different angles with respect to the axis of said vehicle and including an adapter connectible to said lever in a plurality of different relations thereto.

12. Tank valve mechanism comprising in combination a tank having a valve opening formed therein, a valve for opening and closing said opening, a valve balancing valve mechanism associated with said valve for balancing fluid pressure exerted on said valve, said mechanism including spaced movable piston members disposed to be oppositely affected by said fluid pressure, a stem connecting said pistons, and means disposed below said opening for operating said valve from the underside of said tank.

WILLIAM S. HOWARD.